US012714973B2

(12) United States Patent
An et al.

(10) Patent No.: US 12,714,973 B2
(45) Date of Patent: Aug. 25, 2026

(54) MIXING DEVICE, SUBSTRATE PROCESSING APPARATUS INCLUDING THE SAME, AND SUBSTRATE PROCESSING METHOD

(71) Applicant: SEMES CO., LTD., Chungcheongnam-do (KR)

(72) Inventors: Gu Yeol An, Busan (KR); Do Gyeong Ha, Daegu (KR); Moon Soon Choi, Chungcheongnam-do (KR); Bu Young Jung, Chungcheongnam-do (KR); Kyung Hun Lee, Chungcheongnam-do (KR); Chae Young Lim, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 972 days.

(21) Appl. No.: 17/952,446

(22) Filed: Sep. 26, 2022

(65) Prior Publication Data

US 2023/0173438 A1 Jun. 8, 2023

(30) Foreign Application Priority Data

Dec. 6, 2021 (KR) ........................ 10-2021-0172676

(51) Int. Cl.
*B01F 25/00* (2022.01)
*B01F 23/40* (2022.01)
(Continued)

(52) U.S. Cl.
CPC .......... *B01F 25/104* (2022.01); *B01F 23/452* (2022.01); *B01F 23/49* (2022.01); *B01F 25/46* (2022.01); *B01F 2101/24* (2022.01)

(58) Field of Classification Search
CPC .... B01F 25/104; B01F 25/46; B01F 2101/24; B01F 23/452
See application file for complete search history.

(56) References Cited

U.S. PATENT DOCUMENTS

| | | | | |
|---|---|---|---|---|
| 3,147,924 A * | 9/1964 | Schulze | E01C 19/105 | 239/404 |
| 3,917,756 A * | 11/1975 | Rice | B01F 33/251 | 239/432 |
| 2008/0227680 A1* | 9/2008 | Lynn | C01B 13/10 | 510/370 |

FOREIGN PATENT DOCUMENTS

| | | |
|---|---|---|
| JP | 2020-190047 | 11/2020 |
| KR | 10-1263395 | 5/2013 |

(Continued)

OTHER PUBLICATIONS

Office Action dated Jun. 22, 2023 for Korean Patent Application No. 10-2021-0172676 and its English translation from Global Dossier.

*Primary Examiner* — Anshu Bhatia
(74) *Attorney, Agent, or Firm* — WOMBLE BOND DICKINSON (US) LLP

(57) ABSTRACT

An apparatus for processing a substrate includes a mixing nozzle having a mixing space that is shaped as an inverted cone, the mixing nozzle including a first inlet, a second inlet and an outlet installed at the mixing space; a first chemical supply unit connected to the first inlet; a second chemical supply unit connected to the second inlet; and a supply tank connected to the outlet, wherein the first chemical supply unit is configured to supply a first chemical solution to the mixing space through the first inlet, the second chemical supply unit is configured to supply a second chemical solution to the mixing space through the second inlet, and the supply tank is supplied with, through the outlet, a solution mixture that is formed of the first chemical solution and the second chemical solution after being mixed in the mixing space.

5 Claims, 11 Drawing Sheets

(51) Int. Cl.

| | |
|---|---|
| ***B01F 23/45*** | (2022.01) |
| ***B01F 25/10*** | (2022.01) |
| ***B01F 25/46*** | (2022.01) |
| *B01F 101/24* | (2022.01) |

(56) References Cited

FOREIGN PATENT DOCUMENTS

| | | |
|---|---|---|
| KR | 10-1685159 | 12/2016 |
| KR | 10-1747035 | 6/2017 |

* cited by examiner

MIXING DEVICE, SUBSTRATE PROCESSING APPARATUS INCLUDING THE SAME, AND SUBSTRATE PROCESSING METHOD

CROSS-REFERENCE TO RELATED APPLICATION

This application claims priority from Korean Patent Application No. 10-2021-0172676 filed on Dec. 6, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a mixing device, a substrate processing apparatus including the same, and a substrate processing method.

2. Description of the Related Art

Furthering integration of semiconductor devices has quickened the miniaturization of circuit patterns while leaving on their substrates residual contaminants, e.g., particles, organic contaminants, metal contaminants, etc. to impart a great influence on device characteristics and production yield. This is handled with a cleaning process performed for removing contaminants remaining on the substrate before and after each of the unit processes of manufacturing a semiconductor.

SUMMARY

For use in the cleaning process, a solution mixture (e.g., SC1) may be provided by mixing a plurality of chemical solutions. The solution mixture may be formed by supplying a plurality of chemical solutions to a tank and mixing the chemical solutions by using a circulation passage connected to the tank. This mixing method requires excessive preparation time. An inline mixer could be used to form the solution mixture, but a flow rate hunting phenomenon may occur due to pressure collision at the chemical supply end of the inline mixer.

Aspects of the present disclosure provide a substrate processing apparatus using a mixing apparatus capable of rapidly and steadily generating a solution mixture.

Another aspect of the present disclosure provides a mixing device capable of rapidly and steadily generating a solution mixture.

Yet another aspect of the present disclosure provides a substrate processing method using a mixing device capable of rapidly and steadily generating a solution mixture.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a substrate processing apparatus includes a mixing nozzle, a first chemical supply unit, a second chemical supply unit, and a supply tank. The mixing nozzle has a mixing space that is shaped as an inverted cone, the mixing nozzle including a first inlet installed on a side surface of the mixing space, a second inlet installed on a top surface of the mixing space, and an outlet installed at a lower portion of the mixing space. The first chemical supply unit is connected to the first inlet. The second chemical supply unit is connected to the second inlet. The supply tank is connected to the outlet. The first chemical supply unit is configured to supply a first chemical solution to the mixing space through the first inlet. The second chemical supply unit is configured to supply a second chemical solution to the mixing space through the second inlet. The supply tank is supplied with, through the outlet, a solution mixture that is formed of the first chemical solution and the second chemical solution after being mixed in the mixing space.

According to another aspect of the present disclosure, there is provided a mixing device including a body, a mixing space installed in the body, a first inlet installed on a side surface of the mixing space and configured to supply a first chemical solution into the mixing space, a second inlet installed on a top surface of the mixing space and configured to supply a second chemical solution into the mixing space, and an outlet installed at a lower portion of the mixing space and configured to discharge a solution mixture that is formed of the first chemical solution and the second chemical solution. Here, the mixing space includes a first region configured to receive the first chemical solution entering from the first inlet, a second region disposed under the first region and allowing the second chemical solution dropping from the second inlet to mix with the first chemical solution, and a third region disposed under the second region and allowing the solution mixture to be discharged, The first region, the second region, and the third region respectively have a first width, a second width that is smaller than the first width, and a third width that is smaller than the second width.

According to yet another aspect of the present disclosure, there is provided a method of processing a substrate, including the steps (not necessarily in the following order) of (i) providing an apparatus for processing a substrate, the apparatus including a mixing nozzle having a mixing space that is shaped as an inverted cone, the mixing nozzle including a first inlet installed on a side surface of the mixing space, a second inlet installed on a top surface of the mixing space, and an outlet installed at a lower portion of the mixing space, the apparatus further including a first chemical supply unit connected to the first inlet, a second chemical supply unit connected to the second inlet, and a supply tank connected to the outlet, (ii) supplying a first chemical solution by the first chemical supply unit to the mixing space through the first inlet while supplying a second chemical solution by the second chemical supply unit to the mixing space through the second inlet so that a flow rate of the first chemical solution being greater than a flow rate of the second chemical solution, and (iii) supplying the supply tank with, through the outlet, a solution mixture that is formed of the first chemical solution and the second chemical solution after being mixed in the mixing space.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
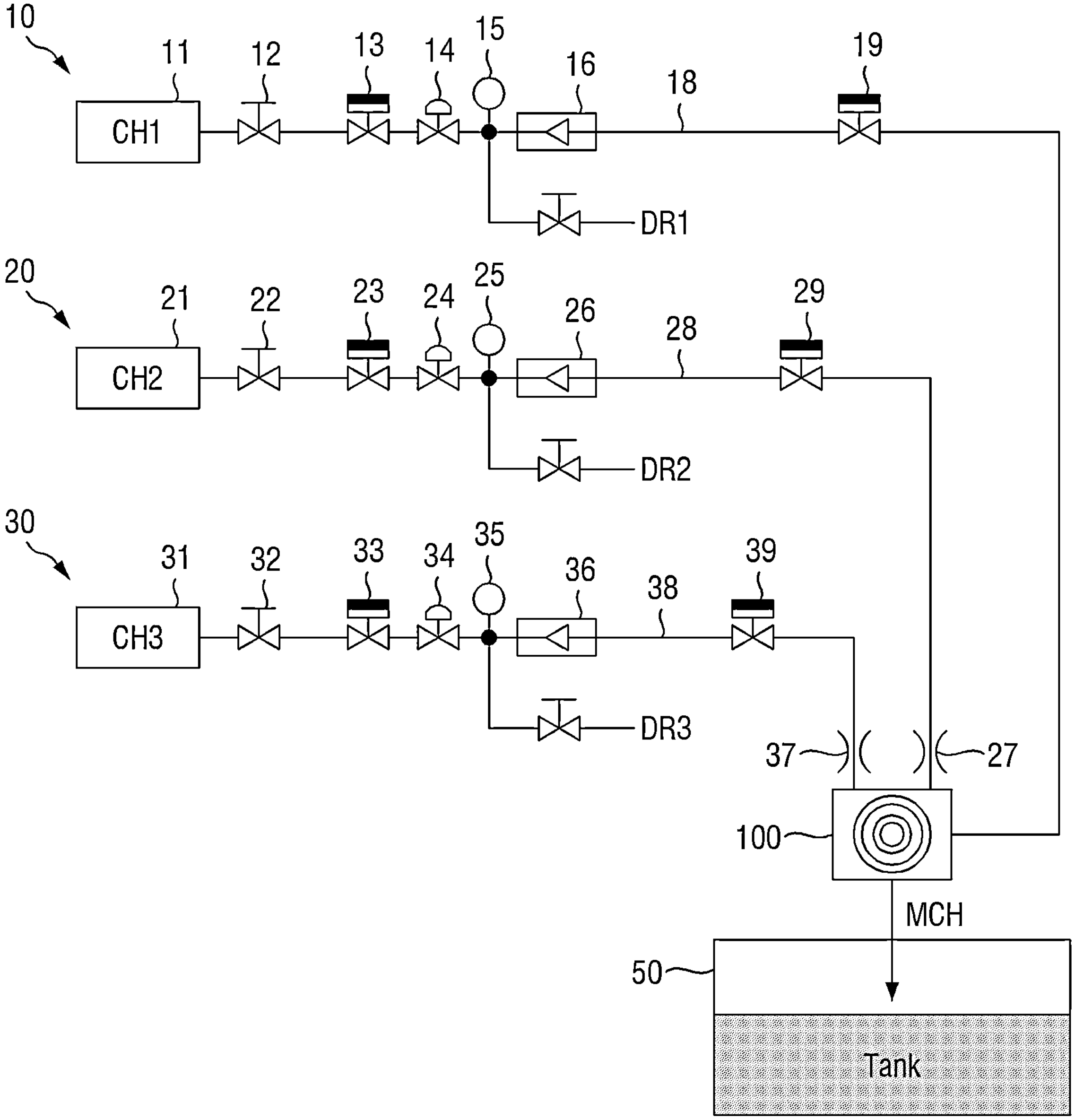
FIG. 1 is a diagram of a substrate processing apparatus according to at least one embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification.

Spatially relative terms, such as “below,” “beneath,” “lower,” “above,” “upper,” and the like, may be used herein for ease of description to convey one element’s or feature’s relationship to another element(s) or feature(s) as illustrated in the drawings. It will be understood that the spatially relative terms are intended to encompass different orientations of the device in use or operation in addition to the orientation depicted in the drawings. For example, when a device in the drawings is turned over, elements described as “below” or “beneath” other elements or features would then be oriented “above” the other elements or features. Thus, the illustrative term “below” can encompass both an orientation of above and below. The device may be otherwise oriented (rotated 90 degrees or at other orientations), and the spatially relative descriptors used herein may be interpreted accordingly.

It will be understood that, although the terms first, second, etc. may be used herein to describe various elements, components, and/or sections, these elements, components, and/or sections should not be limited by these terms. These terms are only used to distinguish one element, component, or section from another element, component, or section. Thus, a first element, first component, or first section discussed below could be termed a second element, second component, or second section without departing from the teachings of the present disclosure.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of related known components and functions when considered to obscure the subject of the present disclosure will be omitted for the purpose of clarity and for brevity.

Figure 2:
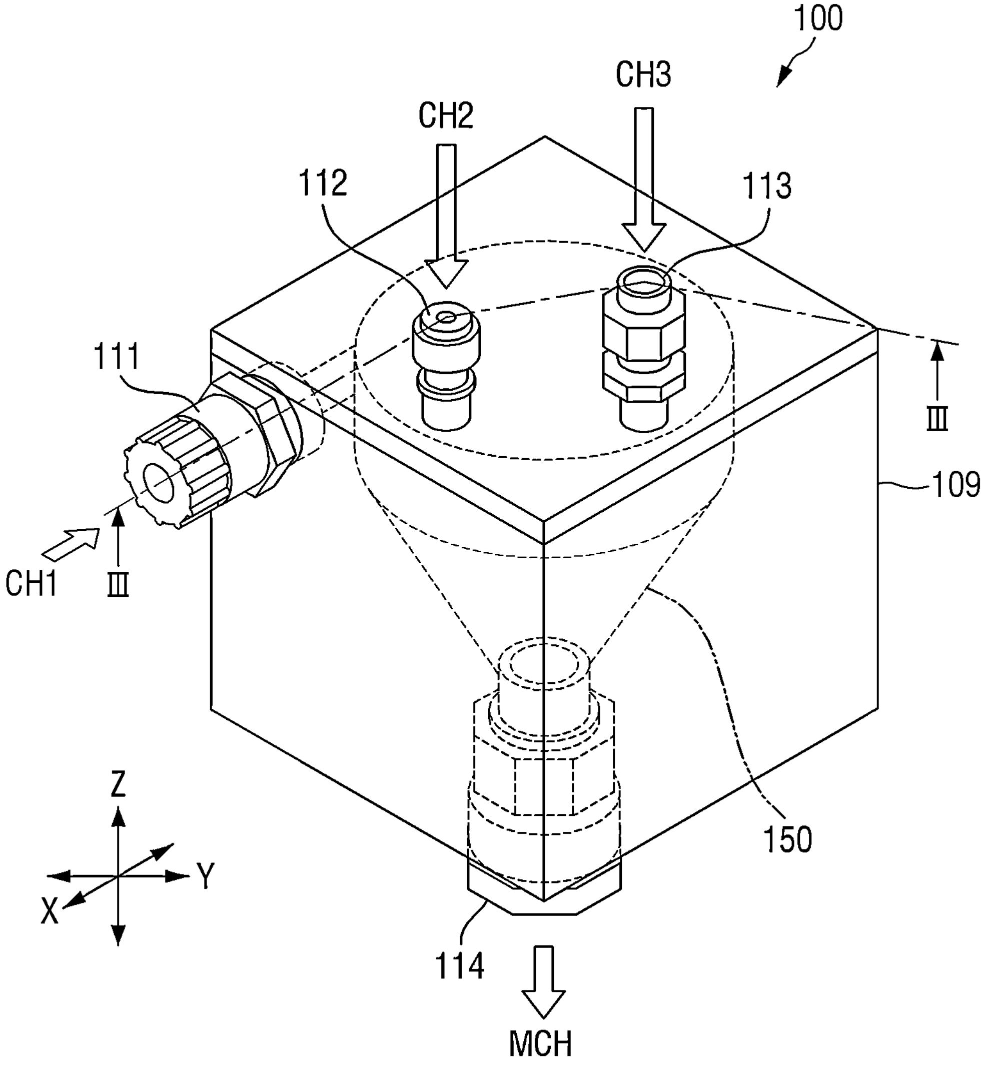
FIG. 2 is a perspective view of a mixing nozzle shown in FIG. 1.
Figure 3:
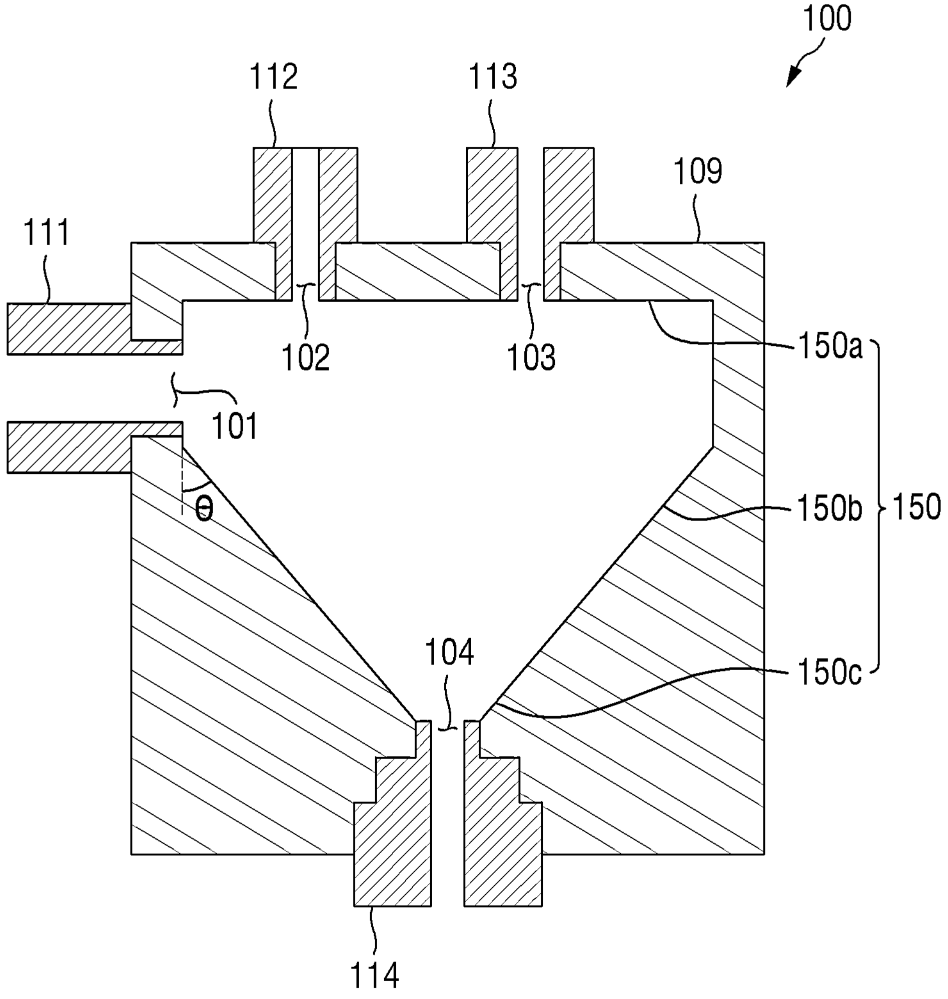
FIG. 3 is a cross-sectional view taken along lines of FIG. 2.
Figure 4:
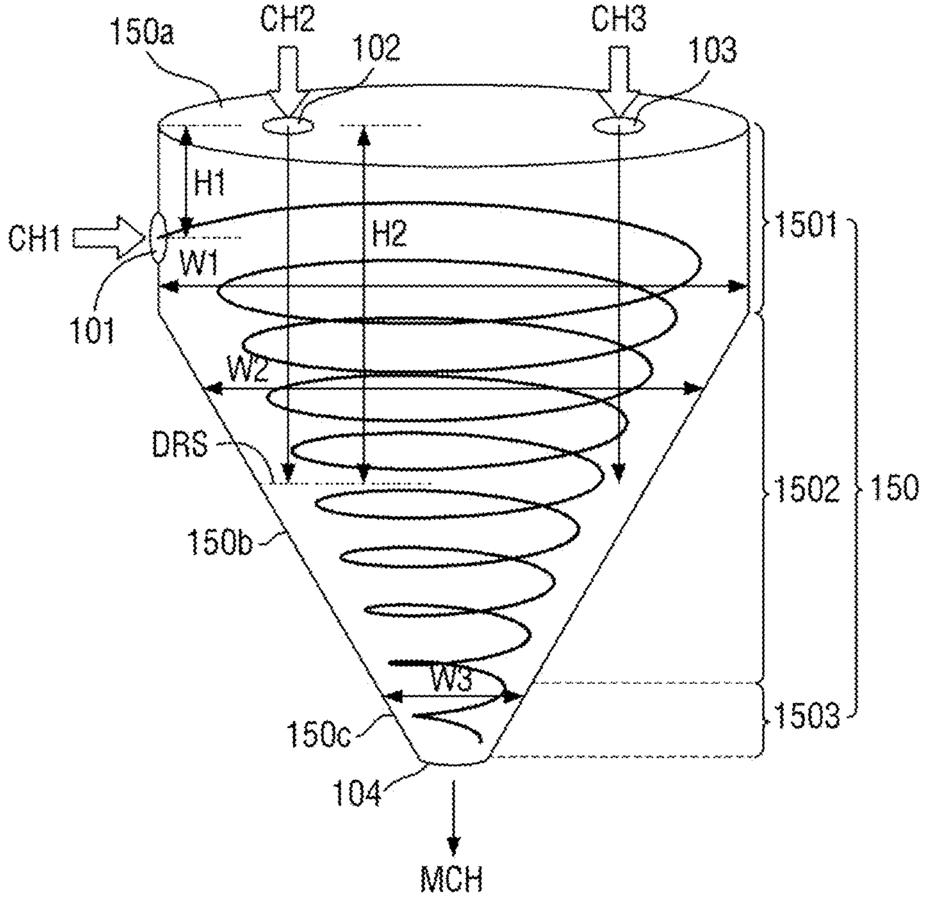
FIG. 4 is a diagram illustrating the operation of the mixing nozzle shown in FIG. 1.
Figure 5:
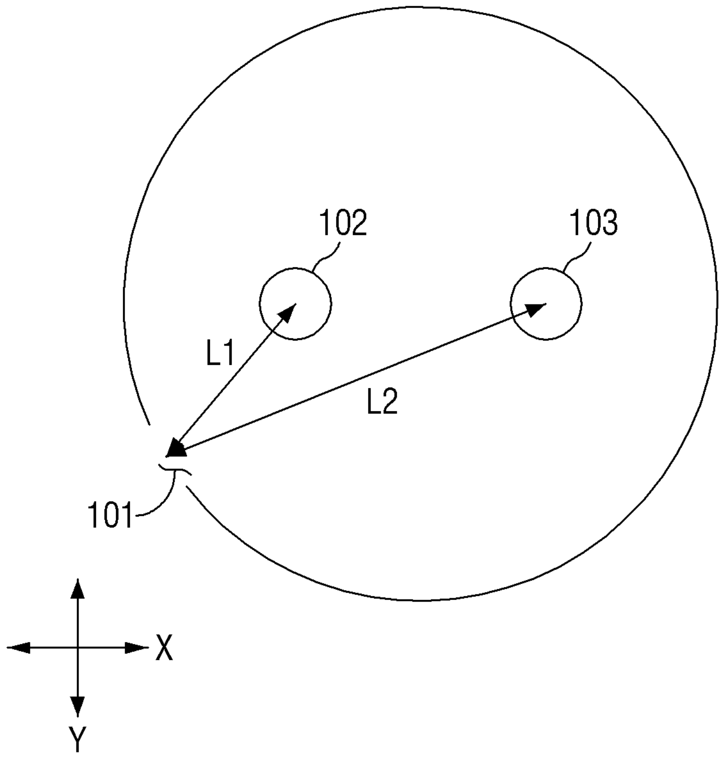
FIG. 5 is a diagram illustrating the relationship between a first inlet, a second inlet, and a third inlet of the mixing nozzle shown in FIG. 1.
Figure 6:
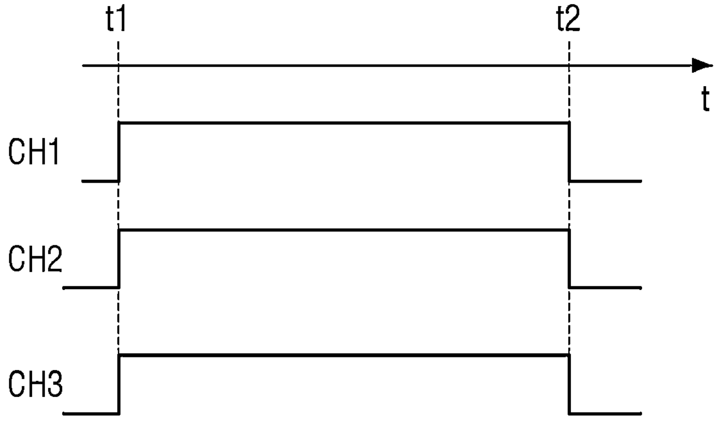
FIG. 6 is a timing diagram for explaining an operation of the substrate processing apparatus shown in FIG. 1.

FIG. 1 is a diagram of a substrate processing apparatus according to at least one embodiment of the present disclosure. FIG. 2 is a perspective view of a mixing nozzle shown in FIG. 1. FIG. 3 is a cross-sectional view taken along lines of FIG. 2. FIG. 4 is a diagram illustrating the operation of the mixing nozzle shown in FIG. 1. FIG. 5 is a diagram illustrating the relationship between a first inlet, a second inlet, and a third inlet of the mixing nozzle shown in FIG. 1. FIG. 6 is a timing diagram for explaining an operation of the substrate processing apparatus illustrated in FIG. 1.

Referring first to FIG. 1, the substrate processing apparatus according to at least one embodiment includes a mixing nozzle 100, a first chemical supply unit 10, a second chemical supply unit 20, a third chemical supply unit 30, and a supply tank 50.

The mixing nozzle 100 receives a first chemical solution CH1 from the first chemical supply unit 10, a second chemical solution CH2 from the second chemical supply unit 20, and a third chemical solution CH3 from the third chemical supply unit 30, and mixes the first chemical solution CH1, the second chemical solution CH2, and the third chemical solution CH3 to form a solution mixture MCH. For example, the first chemical solution CH1 is deionized water (DIW), the second chemical solution CH2 is ammonia, the third chemical solution CH3 is hydrogen peroxide, and the solution mixture (MCH) may be Standard Clean 1 (SC1).

The first chemical supply unit 10 includes a first tank 11, a first manual valve 12, a first on-off valve 13, a first pressure-matching valve 14, a first pressure gauge 15, a first flow meter 16, and a first flow control valve 19, which are all installed along a first supply line 18.

The first manual valve 12 is installed for interlock operation performed when, for example, a preset process standard is not satisfied, by the operator using the first manual valve 12 to completely stop the supply of the first chemical solution CH1 and enter maintenance, repair, modification, etc.

When the first on-off valve 13 is turned on, the first chemical solution CH1 is supplied, and when it is turned off, the first chemical solution CH1 is not supplied.

The first pressure-matching valve 14 fixes the pressure in the first supply line 18 at a predetermined value.

The first pressure gauge 15 measures the pressure in the first supply line 18, and the first flow meter 16 measures the flow rate of the first chemical solution CH1 in the first supply line 18.

The first flow control valve 19 controls the flow rate of the first chemical solution CH1 provided to the mixing nozzle 100.

Connected to the first supply line 18 is a first drain line DR1 for allowing the first chemical solution CH1 to be discharged thereto from the first supply line 18.

The second chemical supply unit 20 includes a second tank 21, a second manual valve 22, a second on-off valve 23, a second pressure-matching valve 24, a second pressure gauge 25, a second flow meter 26, and a second flow control valve 29, which are all installed along a second supply line 28. A second drain line DR2 is connected to the second supply line 28.

The third chemical supply unit 30 includes a third tank 31, a third manual valve 32, a third on-off valve 33, a third pressure-matching valve 34, a third pressure gauge 35, a third flow meter 36, and a third flow control valve 39, which are all installed along a third supply line 38. A third drain line DR3 is connected to the third supply line 38.

The size of the first supply line 18 may be larger than those of the second supply line 28 and the third supply line 38. For example, the first supply line 18 may be sized ¾ inch, when the second supply line 28 and the third supply line 38 may be sized ¼ inch.

Additionally, the second supply line 28 may be installed with an orifice 27 for controlling the flow rate of the second chemical solution CH2. The flow rate of the second chemical solution CH2 can be adjusted through the second flow control valve 29, but the orifice 27 is used to more precisely control the flow rate of the second chemical solution CH2.

The third supply line 38 may be installed with an orifice 37 for controlling the flow rate of the third chemical solution CH3. The flow rate of the third chemical solution CH3 can be adjusted through the third flow control valve 39, but the orifice 27 is used to more precisely control the flow rate of the third chemical solution CH3.

In the substrate processing apparatus according to at least one embodiment of the present disclosure, the first chemical solution CH1, the second chemical solution CH2, and the third chemical solution CH3 are not directly supplied to the supply tank 50. The first chemical solution CH1, the second chemical solution CH2, and the third chemical solution CH3 are mixed in the mixing nozzle 100 to form the solution mixture MCH which is then supplied through a single line to the supply tank 50.

Referring to FIGS. 2 and 3, the mixing nozzle 100 includes at least a body 109, a mixing space 150, a first inlet 101, a second inlet 102, a third inlet 103, and an outlet 104.

The first inlet 101 is installed on a side surface 150*b* of the mixing space 150. The first chemical solution CH1 is supplied into the mixing space 150 through the first inlet 101. The first inlet 101 is installed with a first connection 111 which is connected to the first supply line 18 (in FIG. 1) of the first chemical supply unit 10.

The second inlet 102 is installed on a top surface 150*a* of the mixing space 150. The second chemical solution CH2 is supplied into the mixing space 150 through the second inlet 102. The second inlet 102 is installed with a second connection 112 which is connected to the second supply line 28 (in FIG. 1) of the second chemical supply unit 20.

The third inlet 103 is installed on the top surface 150*a* of the mixing space 150. The third chemical solution CH3 is supplied into the mixing space 150 through the third inlet 103. The third inlet 103 is installed with a third connection 113 which is connected to the third supply line 38 (in FIG. 1) of the third chemical supply unit 30.

The outlet 104 and a fourth connection 114 are installed in a lower portion 150*c* of the mixing space 150. The first chemical solution CH1, the second chemical solution CH2, and the third chemical solution CH3 are mixed in the mixing space 150 to form the solution mixture MCH which is supplied through the outlet 104 to the tank 50.

Meanwhile, the mixing space 150 is shown to have side surfaces 150*b* at least partially inclined at a predetermined angle θ. In other words, the lower portion 150*c* of the mixing space 150 is narrower than the top surface 150*a*. Accordingly, the side surfaces 150*b* connecting the lower portion 150*c* with the top surface 150*a* are inclined toward the lower portion 150*c*.

This mixing space 150 may, for example, have an overall inverted cone shape.

Here, referring to FIG. 4, the first chemical solution CH1 enters the mixing space 150 at the first inlet 101 and moves spirally along the side surfaces 150*b* of the mixing space 150 to the lower portion 150*c* thereof. So, the first chemical solution CH1 reaches the tip of the inverted cone shape while moving spirally. As the first chemical solution CH1 moves downward in a spiral, the flowing speed thereof may increase.

On the other hand, the second chemical solution CH2 drops from the second inlet 102, and the third chemical solution CH3 drops from the third inlet 103. The second chemical solution CH2 and the third chemical solution CH3 drop to positions DRS on the side surfaces 150*b* of the mixing space 150.

The flow rate of the first chemical solution CH1 is greater than the flow rate of the second chemical solution CH2 or the flow rate of the third chemical solution CH3. This means that the first chemical solution CH1 of a large flow rate forms a vortex to be joined by the second chemical solution CH2 and the third chemical solution CH3 of a small flow rate, resulting in a steady formation of the solution mixture MCH. Additionally, the second chemical solution CH2 and the third chemical solution CH3 of a small flow rate are made to drop from the upper portion of the mixing space 150, thereby avoiding flow rate hunting due to collision.

In other words, a distance H2 from the top surface 150*a* of the mixing space 150 to the position DRS where the second chemical solution CH2 and/or the third chemical solution CH3 drops is greater than a distance H1 from the top surface 150*a* of the mixing space 150 to the first inlet 101. Accordingly, after the first chemical solution CH1 begins to flow in a spiral at a sufficient speed, the second chemical solution CH2 and the third chemical solution CH3 are combined with the first chemical solution CH1. This configuration can provide a steady formation of the solution mixture MCH.

Alternatively, the mixing space 150 may include a first region 1501, a second region 1502, and a third region 1503.

The first region 1501 is an area in which the first inlet 101 is installed. In the first region 1501, the first chemical solution CH1 enters the mixing space 150 at the first inlet 101.

The second region 1502 is disposed under the first region 1501. In the second region 1502, the first chemical solution CH1 may flow spirally along the side surfaces 150*b*, and the second chemical solution CH2 and the third chemical solution CH3 drop into the flowing first chemical solution CH1. Accordingly, the first chemical solution CH1, the second chemical solution CH2, and the third chemical solution CH3 are mixed. The depth (or length) of the second region 1502 is determined to sufficiently mix the first chemical solution CH1, the second chemical solution CH2, and the third chemical solution CH3.

The third region 1503 is disposed under the second region 1502. Discharged from the third region 1503 is the solution mixture MCH of the first chemical solution CH1, the second chemical solution CH2, and the third chemical solution CH3.

As illustrated, the first region 1501, the second region 1502, and the third region 1503 may respectively have a first width W1, a second width W2 that is smaller than the first width W1, and a third width W3 that is smaller than the second width W2. This configuration renders the mixing space 150 to be narrower toward the bottom (that is, closer to the outlet 104), allowing the first chemical solution CH1 a good time to flow at a sufficient speed spirally before it is joined by the second chemical solution CH2 and the third chemical solution CH3. Therefore, the first chemical solution CH1, the second chemical solution CH2, and the third chemical solution CH3 are mixed quickly and easily.

FIGS. 3 and 4 illustrate an inverted cone shape as an example of the mixing space 150, but the inverted cone shape may vary. For example, although the drawings show the first width W1 of the first region 1501 as being constant as opposed to the downwardly narrowing profile of the second width W2 of the second region 1502 and the third width W3 of the third region 1503, the present disclosure is not limited thereto. For example, the first width W1 of the first region 1501 may also become narrower toward the bottom. Alternatively, the third width W3 of the third region 1503 may not be narrowing but may be constant.

Referring to FIG. 5, when the flow rate of the third chemical solution CH3 is greater than the flow rate of the second chemical solution CH2, the first inlet 101 and the third inlet 103 may be allowed to be separated by a distance L2 greater than a distance L1 between the first inlet 101 and the second inlet 102.

With equal or slightly different flow rates between the second chemical solution CH2 and the third chemical solution CH3, the distance L2 between the first inlet 101 and the third inlet 103 or the distance L1 between the first inlet 101 and the second inlet 102 may not significantly affect the generation of the solution mixture MCH. However, when the flow rate of the third chemical solution CH3 is considerably larger than that of the second chemical solution CH2, it is preferable that the third inlet 103 for supplying the third chemical solution CH3 with a medium flow rate be more preferably separated from the first inlet 101 than the second inlet 102 is, which supplies the second chemical solution CH2 with a small flow rate.

Referring now to FIG. 6, all of the first chemical solution CH1, the second chemical solution CH3, and the third chemical solution CH3 may be controlled to start their supplies at time t1 and end them at time t3. The present disclosure may control the supplies of the first chemical solution CH1, the second chemical solution CH3, and the third chemical solution CH3 to be concurrent.

The substrate processing apparatus according to at least one embodiment may control the supply times of the different chemical solutions CH1, CH2, and CH3 to be concurrent, while changing the sizes of the supply lines 18, 28, and 38 according to the mixing ratio of the chemical solutions. For example, when the first chemical solution CH1 needs to be supplied three times more than the second chemical solution CH2 and than the third chemical solution CH3, the size of the first supply line 18 may be three times larger than the size of the second supply line 28 or the size of the third supply line 38. For example, where the size of the first supply line 18 is ¾ inch, the second supply line 28 and the third supply line 38 may each be ¼ inch.

In sum, referring to FIGS. 1 to 6, the first chemical solution CH1, the second chemical solution CH2, and the third chemical solution CH3 are not directly supplied to the supply tank 50. They are mixed in the mixing nozzle 100 to form the solution mixture MCH which is then supplied through a single line to the supply tank 50.

In the mixing space 150 of the mixing nozzle 100, the large flow rate of the first chemical solution CH1 forms the vortex, onto which the small flow rates of the second chemical solution CH2 and the third chemical solution CH3 are merged, thereby providing a quick and efficient formation of the solution mixture MCH. Additionally, the present disclosure shortens the preparation time for generating the solution mixture MCH.

Figure 7:
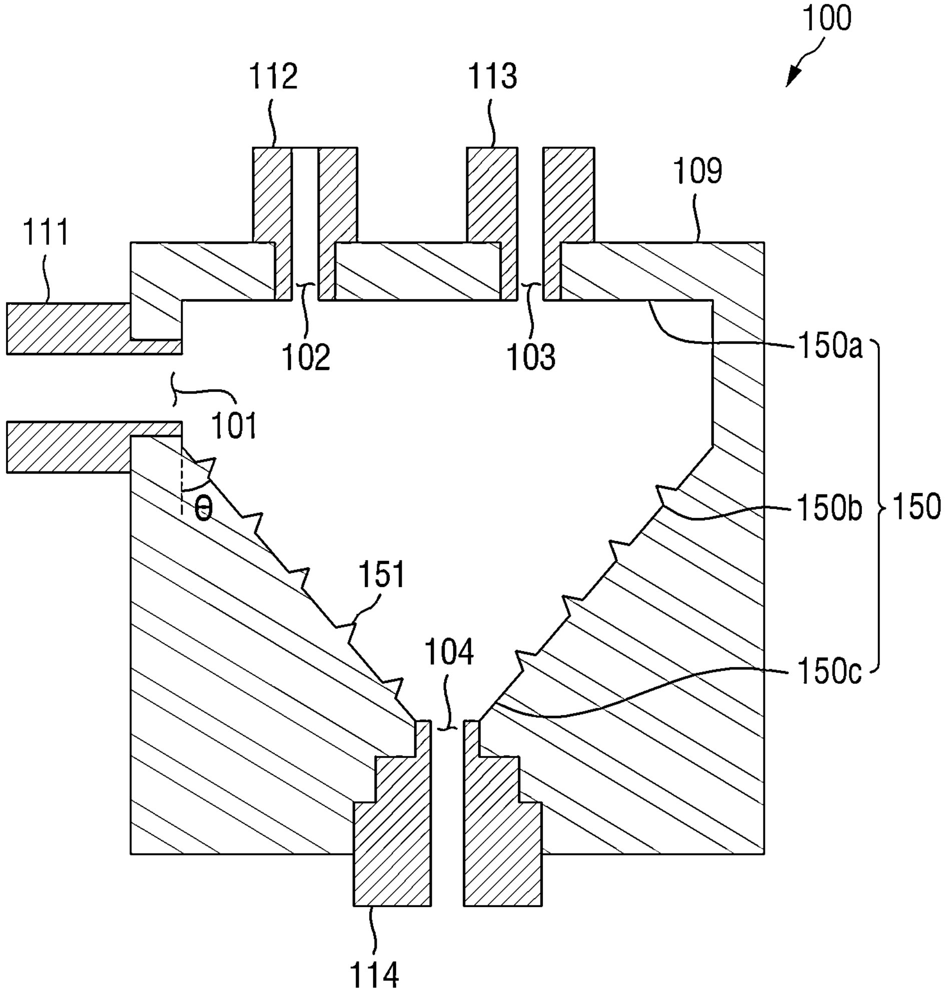
FIG. 7 is a cross-sectional view illustrating a mixing nozzle according to another embodiment of the present disclosure.

FIG. 7 is a cross-sectional view illustrating a mixing nozzle 150 according to another embodiment of the present disclosure. The following description focuses on different points from those described with reference to FIGS. 1 to 6.

Referring to FIG. 7, in the mixing nozzle according to another embodiment, a thread 151 is installed on a side surface 150*b* of the mixing space 150. The first chemical solution CH1 may move spirally along the thread 151. As a result, the thread 151 helps to form a vortex of the first chemical solution CH1. This can facilitate the mixing of the first chemical solution CH1, the second chemical solution CH2, and the third chemical solution CH3.

Figure 8:
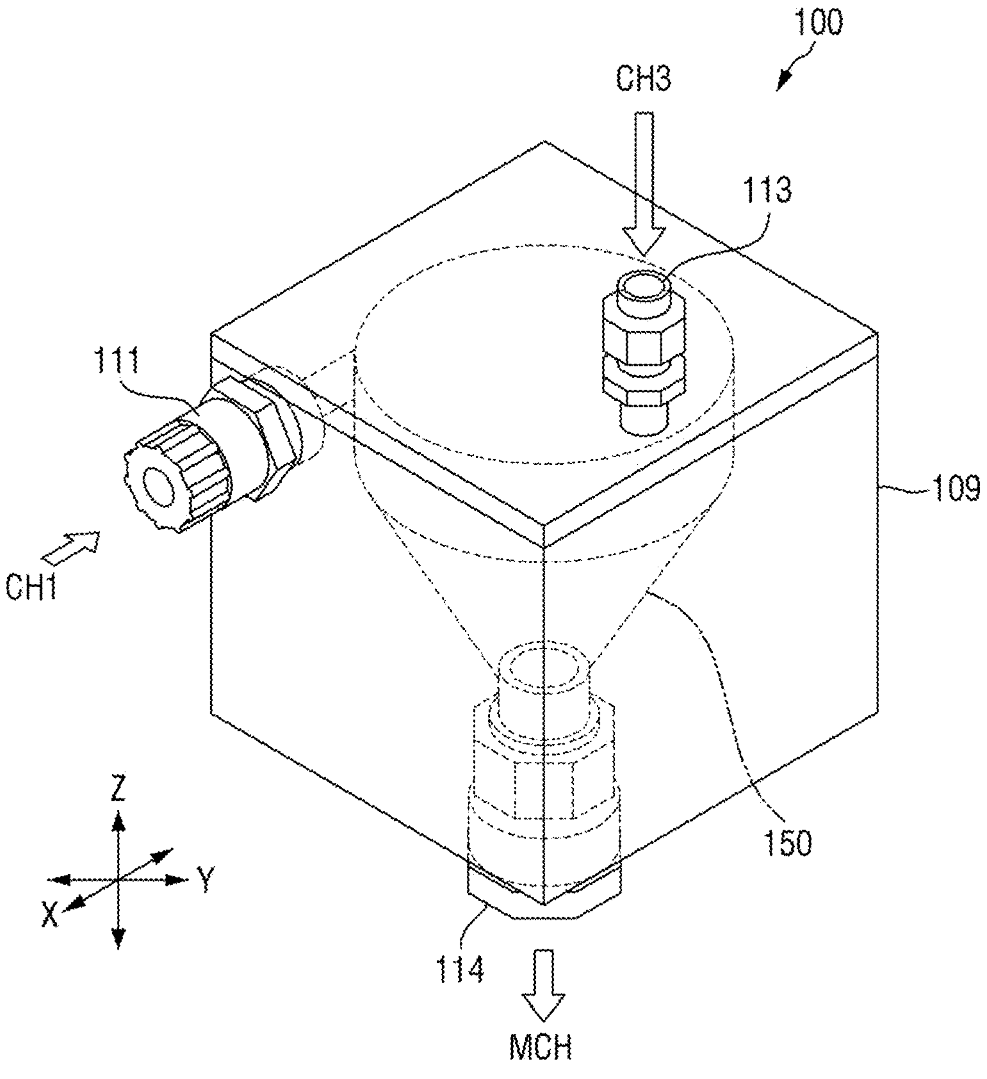
FIG. 8 is a perspective view illustrating a mixing nozzle according to yet another embodiment of the present disclosure.

FIG. 8 is a perspective view illustrating a mixing nozzle 100 according to yet another embodiment of the present disclosure. The following description focuses on different points from those described with reference to FIGS. 1 to 6.

Referring to FIG. 8, the mixing nozzle 100 includes at least a body 109, a mixing space 150, a first and a second inlet (as 101 and 103 in FIG. 3), and a third inlet (as 103 in FIG. 3), and an outlet (as 104 in FIG. 3).

The first inlet (101) and its first connection 111 are installed on a side surface (as 150*b* in FIG. 3) of the mixing space 150. The first chemical solution CH1 is supplied into the mixing space 150 through the first connection 111. The third inlet (103) and its third connection 113 are installed on the top surface of the mixing space 150. The third chemical solution CH3 is supplied into the mixing space 150 through the third connection 113. The outlet (104) and the fourth connection 114 is installed in the lower portion of the mixing space 150. The first chemical solution CH1 and the third chemical solution CH3 are mixed in the mixing space 150 to form the solution mixture MCH which is then supplied to the supply tank through the outlet 104.

Figure 9:
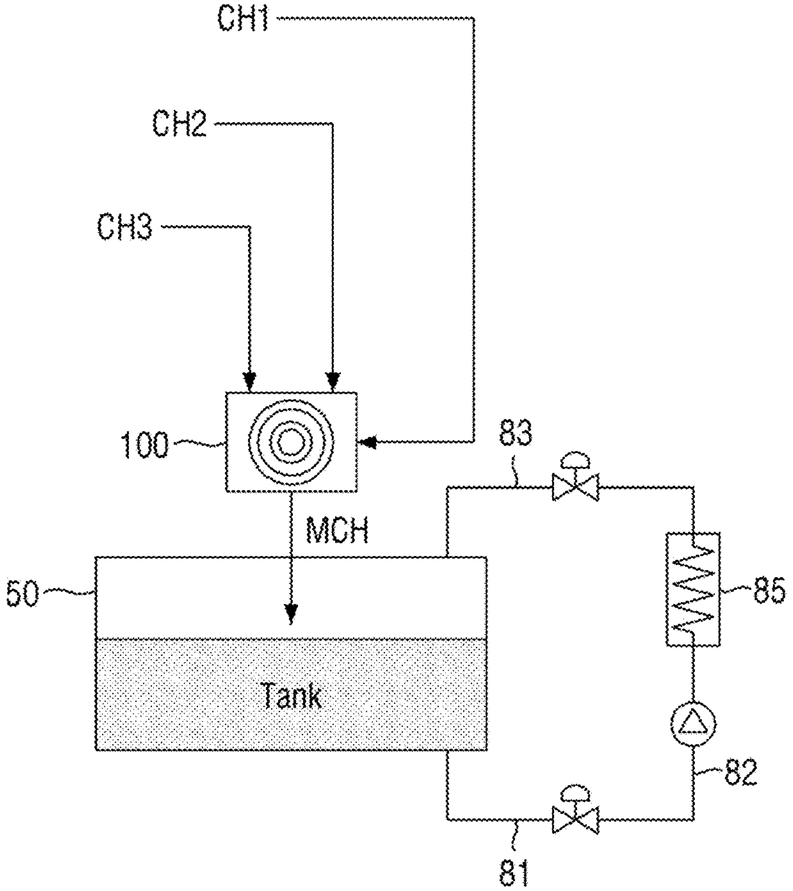
FIG. 9 is a diagram illustrating a substrate processing apparatus according to another embodiment of the present disclosure.

FIG. 9 is a diagram illustrating a substrate processing apparatus according to another embodiment of the present disclosure. The following description focuses on different points from those described with reference to FIGS. 1 to 6.

Referring to FIG. 9, in the substrate processing apparatus according to another embodiment, the mixing nozzle 100 is provided with a first chemical solution CH1, a second chemical solution CH2, and a third chemical solution CH3 to mix them in the internal mixing space and thereby form and deliver a solution mixture MCH to a supply tank 50.

The substrate processing apparatus according to another embodiment further includes a circulation passage 81, 82, and 83 connected to the supply tank 50.

For example, when the temperature of the solution mixture MCH in the supply tank 50 is lower than a preset temperature, the solution mixture MCH may be heated by a heater 85 while moving along the circulation passage 81, 82, and 83. In this way, the temperature of the solution mixture MCH may be raised to the preset temperature.

Figure 10:
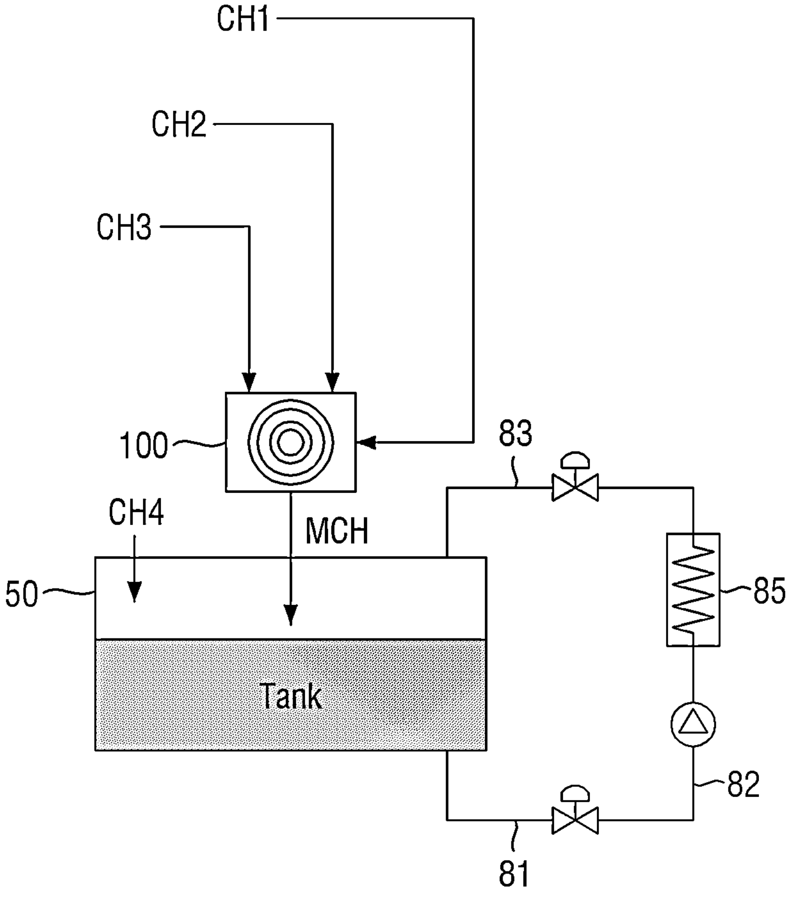
FIG. 10 is a diagram illustrating a substrate processing apparatus according to yet another embodiment of the present disclosure.

FIG. 10 is a diagram illustrating a substrate processing apparatus according to yet another embodiment of the present disclosure. The following description focuses on different points from those described with reference to FIG. 9.

Referring to FIG. 10, the substrate processing apparatus according to yet another embodiment further includes a fourth chemical supply unit for directly supplying a fourth chemical solution CH4 to the supply tank 50, and a circulation passage 81, 82, and 83 connected to a supply tank 50.

To additionally mix the fourth chemical solution CH4 with the solution mixture MCH, the circulation passage 81, 82, and 83 is used. For example, the fourth chemical solution CH4 and the solution mixture MCH are mixed while moving along the circulation passage 81, 82, and 83. Additionally, the fourth chemical solution CH4 and the solution mixture MCH may be heated by a heater 85 while flowing along the circulation passage 81, 82, and 83.

Figure 11:
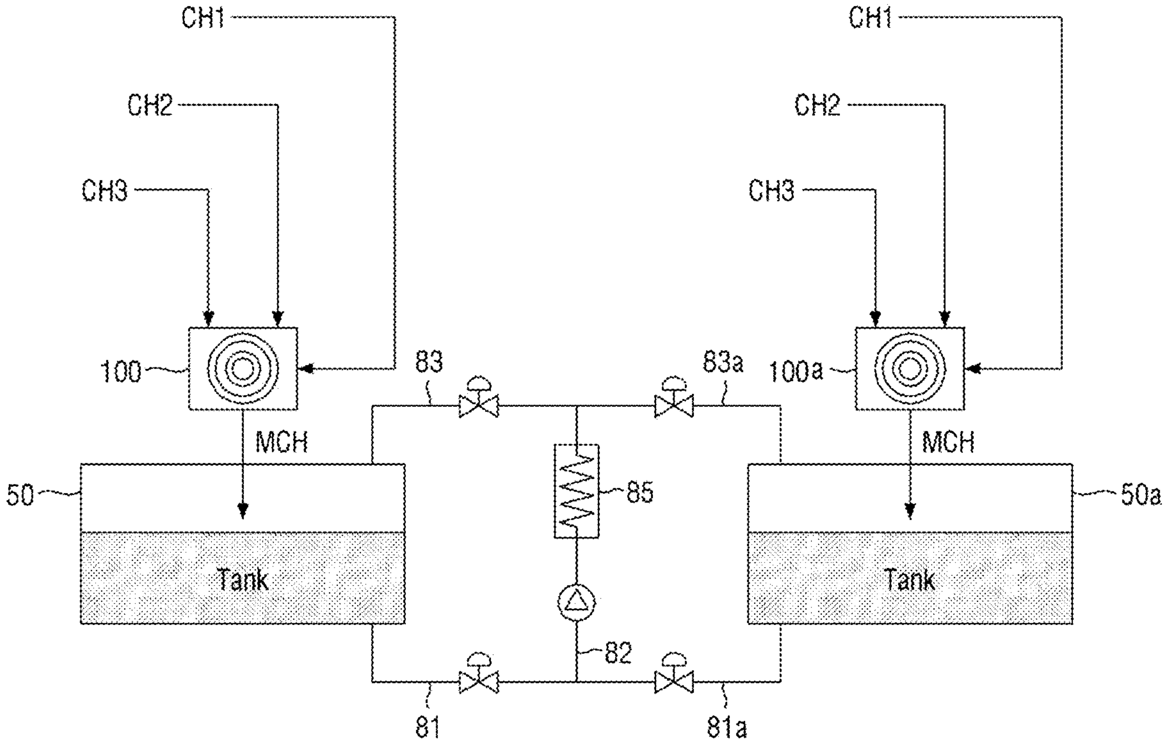
FIG. 11 is a diagram illustrating a substrate processing apparatus according to yet another embodiment of the present disclosure.

FIG. 11 is a diagram illustrating a substrate processing apparatus according to yet another embodiment of the present disclosure. The following description focuses on different points from those described with reference to FIGS. 1 to 10.

Referring to FIG. 11, the substrate processing apparatus according to yet another embodiment includes a supply tank 50 and a sub-supply tank 50*a*. While the supply tank 50 supplies a solution mixture MCH to a process chamber, the sub-supply tank 50*a* may prepare for supplying the solution mixture MCH. Alternately, while the sub-supply tank 50*a* supplies the solution mixture MCH to the process chamber, the supply tank 50 may prepare for supplying the solution mixture MCH.

The mixing nozzle 100 is provided with a first chemical solution CH1, a second chemical solution CH2, and a third chemical solution CH3 to mix them in its internal mixing space and thereby form and deliver the solution mixture MCH to the supply tank 50.

Similarly, a mixing nozzle 100*a* is provided with the first chemical solution CH1, the second chemical solution CH2, and the third chemical solution CH3 to mix them in its internal mixing space and thereby form and deliver the solution mixture MCH to the sub-supply tank 50*a*.

The supply tank 50 is installed with a circulation passage 81, 82, and 83, while the sub-supply tank 50*a* is provided with a circulation passage 81*a*, 82, and 83*a*. The circulation passage 81*a*, 82, and 83*a* includes a flow path 82 that may be installed with a heater 85 and may be shared by the supply tank 50 and the sub-supply tank 50*a*.

When the temperature of the solution mixture MCH in the sub-supply tank 50*a* is lower than a preset temperature, the solution mixture MCH may be heated by the heater 85 while moving along the circulation passage 81*a*, 82, and 83*a*. While the solution mixture MCH moves along the circulation passage 81*a*, 82, and 83*a*, the concentration of the solution mixture MCH may be additionally adjusted.

Figure 12:
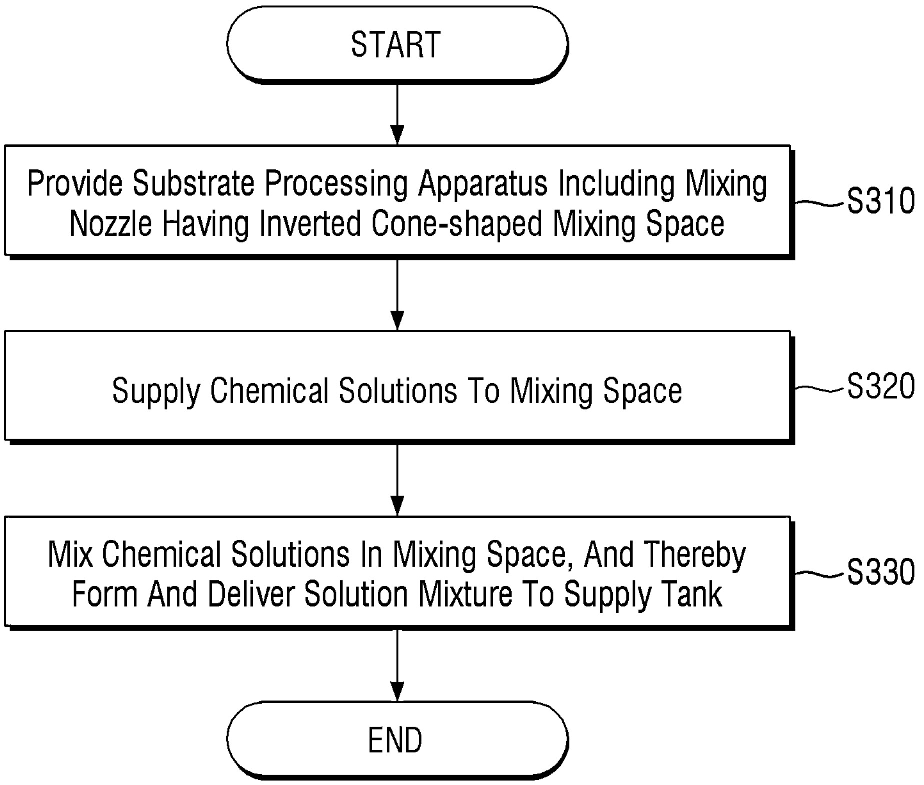
FIG. 12 is a flowchart of a substrate processing method according to some embodiments of the present disclosure.

FIG. 12 is a flowchart of a substrate processing method according to some embodiments of the present disclosure.

Referring to FIGS. 1 to 4 and 12, the method begins with providing a substrate processing apparatus (S310).

Specifically, the substrate processing apparatus includes (i) a mixing nozzle 100 having a mixing space 150 formed internally with an inverted cone shape, the mixing nozzle 100 including a first inlet 101 installed on a side surface 150*b* of the mixing space 150, a second inlet 102 installed on a top surface 150*a* of the mixing space 150, and an outlet 104 installed at a lower portion 150*c* of the mixing space 150, (ii) a first chemical supply unit 10 connected to the first inlet 101, (iii) a second chemical supply unit 20 connected to the second inlet 102, and (iv) a supply tank 50 connected to the outlet 104.

Then, the method supplies the chemical solutions to the mixing space 150 (S320).

Specifically, the first chemical supply unit 10 supplies a first chemical solution CH1 through the first inlet 101 to the mixing space 150, the second chemical supply unit 20 supplies a second chemical solution CH2 through the second inlet 102 to the mixing space 150, and the third chemical supply unit 30 supplies a third chemical solution CH3 through the third inlet 103 to the mixing space 150. Here, the flow rate of the first chemical solution CH1 is greater than that of the second chemical solution CH2 and that of the third chemical solution CH3. The first chemical solution CH1 of a large flow rate forms a vortex, to which the second chemical solution CH2 and the third chemical solution CH3 of a small flow are joined, thereby providing a steady formation of the solution mixture MCH.

Subsequently, the method mixes the chemical solutions in the mixing space 150 and thereby forms and delivers the solution mixture MCH to the supply tank 50 (S330).

This holds the first chemical solution CH1, the second chemical solution CH2, and the third chemical solution CH3 from being directly supplied to the supply tank 50. The first chemical solution CH1, the second chemical solution CH2, and the third chemical solution CH3 are mixed in the mixing nozzle 100 to form the solution mixture MCH which is then supplied through a single line to the supply tank 50.

While a few exemplary embodiments of the present disclosure have been described with reference to the accompanying drawings, those skilled in the art will readily appreciate that various changes in form and details may be made therein without departing from the technical idea and scope of the present disclosure as defined by the following claims. Therefore, it is to be understood that the foregoing is illustrative of the present disclosure in all respects and is not to be construed as limited to the specific exemplary embodiments disclosed.

The invention claimed is:

1. An apparatus for processing a substrate, the apparatus comprising:

a mixing nozzle having a mixing space that is shaped as an inverted cone, the mixing nozzle comprises a first inlet installed on a side surface of the mixing space, a second inlet positioned higher than the first inlet and installed on a top surface of the mixing space, a third inlet positioned higher than the first inlet and installed on the top surface of the mixing space, and an outlet installed at a lower portion of the mixing space;

a first chemical supply unit connected to the first inlet and configured to supply a first chemical solution into the mixing space through the first inlet;

a second chemical supply unit connected to the second inlet and configured to supply a second chemical solution into the mixing space through the second inlet;

a supply tank connected to the outlet, the outlet supplying the supply tank with a solution mixture formed of the first chemical solution and the second chemical solution that are mixed in the mixing space;

a third chemical supply unit that is connected to the third inlet and configured to supply a third chemical solution through the third inlet into the mixing space; and a fourth chemical supply unit configured to directly supply a fourth chemical solution to the supply tank through a second inlet of the supply tank different from a first inlet of the supply tank that is connected to the outlet of the mixing nozzle, wherein the supply tank is installed with a circulation flow path that is used to mix the fourth chemical solution with the solution mixture already within the supply tank.

2. The apparatus of claim 1, wherein and the first inlet and the third inlet are separated by a distance that is greater than a distance between the first inlet and the second inlet.

3. The apparatus of claim 1, wherein a distance from the top surface of the inverted cone to a position where the second chemical solution is dropped onto the first chemical solution is greater than a distance from the top surface of the inverted cone to the first inlet.

4. The apparatus of claim 1, wherein the second chemical supply unit includes a supply line connected to the second inlet and an orifice installed in the supply line.

5. The apparatus of claim 1, wherein a first time period for which the first chemical supply unit is configured to supply the first chemical solution is equal to a second time period for which the second chemical supply unit is configured to supply the second chemical solution.

* * * * *